United States Patent [19]

Koshiishi

[11] Patent Number: 4,956,876

[45] Date of Patent: Sep. 11, 1990

[54] DC DECOUPLED RADIO COMMUNICATION SYSTEM

[75] Inventor: Takaho Koshiishi, Tokyo, Japan

[73] Assignee: Ricoh Company, Ltd., Tokyo, Japan

[21] Appl. No.: 284,690

[22] Filed: Dec. 15, 1988

[30] Foreign Application Priority Data

Dec. 15, 1987 [JP] Japan .................... 62-315156

[51] Int. Cl.$^5$ ............................................. H04B 1/44
[52] U.S. Cl. ........................................ 455/78; 455/89; 455/74; 455/344; 374/58; 374/100; 358/400
[58] Field of Search ............... 455/78, 79, 82, 117, 455/74, 89, 344, 95; 358/400, 442, 441; 379/100, 58; 375/5

[56] References Cited

U.S. PATENT DOCUMENTS

| 4,106,025 | 8/1978 | Katz ........................... 455/78 |
| 4,773,080 | 9/1988 | Nakajima et al. ............ 375/5 |
| 4,796,091 | 1/1989 | Nohtomi ...................... 358/444 |
| 4,809,297 | 2/1989 | Polansky et al. ............. 455/79 |

FOREIGN PATENT DOCUMENTS

| 3514678 | 10/1986 | Fed. Rep. of Germany ........ 455/78 |
| 0007615 | 1/1977  | Japan ........................................ 455/78 |
| 1272512 | 11/1986 | U.S.S.R. ................................... 455/78 |

Primary Examiner—Douglas W. Olms
Assistant Examiner—Ralph Smith
Attorney, Agent, or Firm—Oblon, Spivak, McClelland, Maier & Neustadt

[57] ABSTRACT

A radio communication system includes a radio unit, an interface circuit, a microphone and a fascimile unit. The interface unit includes a transformer through which signals are transferred between the radio unit and a seelcted one of the microphone and the facsimile unit so that d.c. components of the signals cannot be transferred. The interface circuit also includes a first relay connected between one winding of the transformer and the microphone and the facsimile unit and a second relay connected between the other winding of the transformer and the radio unit. The system also includes a mode select switch which is operatively coupled to the first and second relays. Thus, mode select signals are also d.c. decoupled signals.

6 Claims, 3 Drawing Sheets

DC DECOUPLED RADIO COMMUNICATION SYSTEM

BACKGROUND OF THE INVENTION

1. Field of the Invention

This invention generally relates to a hybrid radio communication system which may be switched between verbal communication and data communication, and, more particularly, to a dc decoupled hybrid radio communication system in which signals exchanged between a radio unit and an interface circuit are dc decoupled. More specifically, the present invention relates to a hybrid radio communication system which may selectively serve as an ordinary radio set for verbal communication or as a radio facsimile for data communication.

2. Description of the Background

A hybrid radio communication system which may serve as a radio set for verbal communication and a radio facsimile machine for facsimile communication is well known and disclosed, for example, in Japanese Pat. Laid-open Pub. No. 61-13764 and Japanese Utility Model Laid-open Pub. No. 60-72048. In general, when carrying out radio facsimile communication using a radio unit, an interface circuit 4 is typically provided between a radio unit 1 and a facsimile unit 2 as shown in FIG. 3. The interface circuit 4 serves to provide impedance matching between the radio unit 1 and the facsimile unit 2 by adjusting the level of each of the signals exchanged between units 1 and 2. It also serves to establish an operative coupling between the radio unit 1 and a microphone 3 during the verbal communication mode or between the radio unit 1 and the facsimile unit 2 during the facsimile (data) communication mode.

If such a hybrid radio communication system is mounted on a vehicle, such as an automobile, then power is supplied by a battery 5 to each of its components as also shown in FIG. 3. Thus, the radio communication system shown in FIG. 3 defines a mobile radio communication system. When this system is in operation, power supply current flows along the paths indicated by the solid lines in FIG. 3. In general, the signal lines 6 between the radio unit 1 and the interface circuit 4 and also the signal lines 7 between the interface circuit 4 and the facsimile unit 2 have ground lines which are dc coupled to each other. For this reason, part of the power supply current tends to flow along these ground lines of signal lines 6 and 7 as diagrammatically indicated by dotted lines d and e in FIG. 3. With part of the power supply current flowing along the ground lines, a resulting voltage drop is superimposed on the signal which is being transmitted, thereby creating a noise problem. The interface circuit 4 is typically disposed close to or integrally with the facsimile unit 2 and thus the signal lines 7 extending therebetween are rather short, so that their line resistances and voltage drops are small. Accordingly, no practical problem is normally presented in signal lines 7.

On the other hand, the radio unit 1 is normally separated from the interface circuit 4, and, thus, the signal lines 6 between the radio unit 1 and the interface circuit 4 tend to be long and their line resistances tend to be large, thereby providing relatively large voltage drops. Therefore, a noise problem could arise in the signal lines 6, which could deteriorate the quality of transmitted data and of the resulting image. Besides, in the prior art system shown in FIG. 3, noises produced at the radio unit 1 or at the facsimile unit 2 could enter into the other unit, which could deteriorate the quality of verbal and data communication.

In order to prevent noises from being transferred from one component to another in such a radio communication system, a transformer may be used to decouple dc components between the component circuits as taught in Japanese Pat. Laid-open Pub. No. 62-125720. Japanse Utility Model Laid-open Pub. No. 60-82869 teaches a hybrid radio communication system for verbal and facsimile communications using a transformer. However, this publication only teaches the use of a transformer for impedance matching.

SUMMARY OF THE INVENTION

In accordance with the present invention, there is provided a radio communication system including a radio unit, a data communication unit, an interface circuit operatively coupled between the radio unit and the data communication unit and a microphone device operatively coupled to the interface circuit. The interface circuit includes a d.c. decoupling means for decoupling d.c. components of information exchanged between the radio unit and a selected one of the data communication unit and the microphone device. The radio unit includes a radio transmitter, a radio receiver and a transmission/reception switching control circuit for selectively activating one of the radio transmitter and the radio receiver in response to a d.c. decoupled select signal supplied from the interface circuit. That is, if one of the data communication unit and the microphone unit becomes operative for the transmission of information, a d.c. decoupled transmit select signal is produced and supplied to the transmission/reception switching control circuit to make the radio transmitter operative. For this purpose, a first switching means is provided in the interface circuit for outputting a d.c. decoupled select signal in response to either one of the data communication unit and the microphone device.

A second switching means is provided in the interface circuit for selectively establishing an operative coupling between the interface circuit and the data communication unit and the microphone device. When a verbal communication mode is to be established, the microphone device is operatively coupled to the interface circuit and also to the radio unit through the d.c. decoupling means. On the other hand, when a data communication mode is to be established, the data communication unit is operatively coupled to the interface circuit and also to the radio unit through the d.c. decoupling means. Thus, the data communication unit and the microphone device are selectively coupled to the d.c. coupling means of the interface circuit.

In the preferred embodiment, the d.c. decoupling means includes at least one transformer. The d.c. coupling means may include other elements, such as photocouplers, A/D and D/A converters, or radio link units. Thus, the d.c. decoupling means includes any means for preventing d.c. components of a signal from being transmitted when the signal is transmitted to or from the radio unit through the interface circuit. In the preferred embodiment, the data communication unit includes a facsimile unit. The microphone device is provided with a push button which normally establishes a data (facsimile) communication mode when not depressed and establishes a verbal communication mode when depressed.

It is therefore a primary object of the present invention to obviate the disadvantages of the prior art as described above and to provide an improved radio communication system having a verbal communication mode and a data communication mode.

Another object of the present invention is to provide an improved hybrid radio communication system immune to noise.

A further object of the present invention is to provide an improved battery-operated hybrid radio communication system which is high in communication performance and quality of transmitted data.

A still further object of the present invention is to provide a dual mode radio communication system simple in structure, compact in size and thus low at cost.

Other objects, advantages and novel features of the present invention will become apparent from the following detailed description of the invention when considered in conjunction with the accompanying drawings.

DESCRIPTION OF THE PREFERRED EMBODIMENTS

Figure 1:
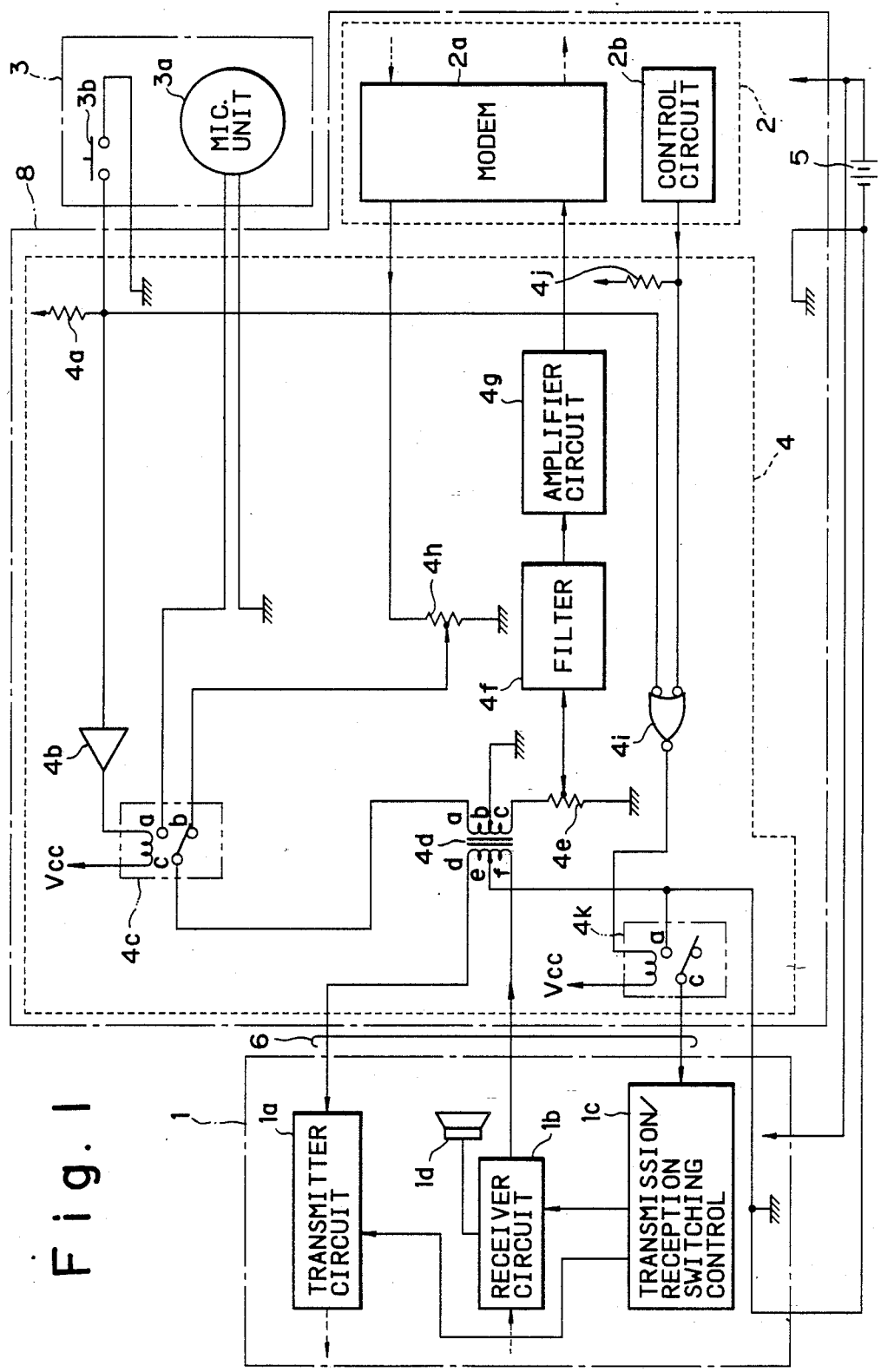
FIG. 1 is a schematic illustration showing the overall structure of a radio communication system constructed in accordance with one embodiment of the present invention.

Various other objects, features and attendant advantages of the present invention will be more fully appreciated as the same becomes better understood from the following detailed description when considered in connection with the accompanying drawings in which like reference characters designated like or corresponding parts throughout the several views and wherein FIG. 1 shows a radio communication system constructed in accordance with one embodiment of the present invention. As shown, the radio facsimile system includes a radio unit 1, a facsimile unit 2, a microphone device 3 and an interface circuit 4. In the illustrated embodiment, the facsimile unit 2 and the interface circuit 4 are provided in the same housing 8. The interface circuit 4 is connected between the radio unit 1 and the facsimile unit 2 and the microphone device 3 is connected to the interface circuit 4.

The microphone device 3 is manually operable and includes a microphone unit 3a and a manually depressable talk switch 3b which must be depressed when the operator wishes to transmit verbal messages. The press talk switch 3b has one terminal which is connected to a ground line of the housing 8 and the other terminal which is pulled up by a resistor 4a provided in the interface circuit 4 and also connected to an input terminal of a relay driver 4b provided in the interface circuit 4. The relay driver 4b has an output terminal which is connected to a power supply voltage $V_{cc}$ through a winding of a relay 4c. The microphone unit 3a has one terminal connected to ground and another terminal connected to a make contact a of the relay 4c. This relay also has a common contact c connected to a terminal a of a right-hand side winding of a hybrid transformer 4d and a break contact b connected to a slider tap of a variable resistor 4h. The right-hand side winding of the transformer 4d has a center tap b connected to ground and another terminal c which is connected to one end of a variable resistor whose other end is grounded. The variable resistor 4e has a slider tap connected to a filter circuit 4f which is connected to a signal input terminal of a MODEM 2a of the facsimile unit 2 through an amplifier circuit 4g. The MODEM 2a includes a signal output terminal which is connected to one end of the variable resistor 4h which has the other end grounded.

The hybrid transformer 4d includes a left-hand side winding which has a terminal d connected to a signal input terminal of a transmitter circuit 1a of the radio unit 1. It is to be noted that ground lines of the radio unit 1 and the interface circuit 4 are electrically insulated from each other and a center tap e of the left-hand side winding of the transformer 4d is connected to the ground line of the radio unit 1. The left-hand side winding of the transformer 4d also includes a terminal f which is connected to an output terminal of a receiver circuit 1b of the radio unit 1.

The facsimile unit 2 includes a control circuit 2b having an output terminal which is pulled up by a resistor 4j and connected to one input terminal of a relay driver 4i in the interface circuit 4. The control circuit 2b outputs a transmission mode signal to keep the present radio communication system in a transmission mode while transmission of information is in progress. The relay driver 4i has another input terminal which is connected to the input terminal of the relay driver 4b and also to one contact of the press talk switch 3b. The relay driver 4i also has an output terminal connected to the power supply voltage through a winding of a relay 4k. This relay has a make contact a connected to the ground line of the radio unit 1 and a common terminal c connected to an input terminal of a transmission/reception switching control circuit 1c of the radio unit 1. The switching control circuit 1c is connected to both of the transmitter circuit 1a and the receiver circuit 1b to control the operative condition of each of these circuits 1a and 1b in response to a select signal supplied from the relay 4k. The radio unit 1 also includes a loud speaker 1d connected to the receiver circuit 1b. Thus, when radio information transmitted from a remote station is received by the receiver circuit 1b, the information is supplied to the loud speaker 1d if the present system is in a verbal communication mode so that the information may be heard by the operator.

The ground line of each of the radio unit 1 and the interface circuit 4 is connected to a negative potential of a battery 5 whose positive terminal is connected to supply the power supply voltage to each of the radio unit 1, facsimile unit 2 and interface circuit 4.

With the above-described structure, when a communication operation is to be carried out by the present radio communication system, a call signal is transmitted to a called station at a remote place by carrying out a predetermined procedure. Normally, the relay 4k is off and thus its common terminal c is set in an open state. Thus, the transmission/reception switching control circuit 1c supplies an activation signal to the receiver circuit 1b to keep the receiver circuit 1b operative while keeping the transmitter circuit 1a inoperative. When the operator at the called station has responded, the voice information of the operator at the called station is received by the receiver circuit 1b and supplied to the loud speaker 1d so that the voice information of the operator at the called station can be heard by the operator at the present radio communication system.

When the operator of the present radio communication system wishes to transmit verbal information to the called station, the operator pushes the press talk switch 3b. With the press talk switch 3b depressed, a low level signal is input into the relay driver 4b which thus causes the relay 4c energized. As a result, the common terminal c of the relay 4c is connected to the contact a, so that the voice information input into the microphone unit 3a by the operator is supplied to the transmitter circuit 1a through the hybrid transformer 4d. In this case, due to the depression of the press talk switch 3b, a low level signal is also input into one of the input terminals of the relay driver 4i so that the winding of the relay 4k is also energized. As a result, the common contact c of the relay 4k is connected to the contact a and thus the ground line of the radio unit 1, whereby a low select signal is supplied to the input terminal of the transmission/reception switching control circuit 1c. Thus, the switching control circuit 1c causes the transmitter circuit 1a to be operative and the receiver circuit 1b to be inoperative. Accordingly, the voice information of the operator input into the microphone unit 3a is transmitted to a remote station from the transmitter circuit 1a in the form of radio waves. In this manner, a verbal communication can be carried out.

On the other hand, in the case of a data communication mode, if image data is to be transmitted from a remote station to the present radio communication system, the reception of such image data is carried out by the facsimile unit 2. In this case, the control circuit 2b outputs a high level signal so that the relay 4k remains off to keep the receiver circuit 1b operative. An image signal in the audio range transmitted from the remote station is received by the receiver circuit 1b, and the thus received image signal is input between the terminals e and f of the left-hand side winding of the hybrid transformer 4d. This image signal is output from the terminals b and c of the right-hand side winding of the transformer 4d, adjusted in level by the variable resistor 4e and filtered by the filter circuit 4f to remove signal components in unnecessary frequency bands. The image signal is then amplified by the amplifier circuit 4g and input into the MODEM 2a. The image signal is then processed in the facsimile unit 2 to be recorded on a sheet of recording paper.

On the other hand, if an image signal is to be transmitted to a remote station from the present communication system, upon apprisal of transmission of image data to the remote station, the operator sets originals to be transmitted in position in the facsimile unit 2 and carries out a predetermined transmission operation. Thus, the facsimile unit 2 starts its transmission process. In this case, the control circuit 2b outputs a low level signal, so that the relay driver 4i keeps the winding of the relay 4k energized to have the input terminal of the switching control circuit 1c connected to the ground line of the radio unit 1. As a result, the switching control circuit 1c renders the transmitter circuit 1a operative while keeping the receiver circuit 1b inoperative. An image signal to be transmitted is output from the MODEM 2a, adjusted in level by the variable resistor 4h and supplied between the terminals a and b of the hybrid transformer 4d. Since the relay 4c is now off, its common contact c remains connected to the contact b. The image signal thus supplied to the transformer 4d is output from the terminals d and e and then supplied to the transmitter circuit 1a for radio transmission to the remote station.

As described above, in accordance with the present embodiment, a transmit/receive select signal from the facsimile unit 2 or the microphone device 3 is supplied to the radio unit 1 through the relay 4k in the interface circuit 4. In this manner, since the select signal is passed through the relay 4k, no d.c. components of the select signal are transmitted to the radio unit 1. In addition, received information from a remote station is supplied from the radio unit 1 either to the microphone device 3 or to the facsimile unit 2 through the hybrid transformer 4d and also information to be transmitted is supplied from either the microphone device 3 or the facsimile unit 2 to the radio unit 1 through the hybrid transformer 4d. And, the ground lines of the radio unit 1 and the facsimile unit 2 are isolated from each other in a d.c. sense. With this structure, no power supply current flows along the signal lines 6 and thus the quality of image does not deteriorate. In addition, any noise produced in the radio unit 1 or the facsimile unit 2 does not enter the other units or circuits and the quality of communication during either verbal or data communication does not deteriorate.

Figure 2:
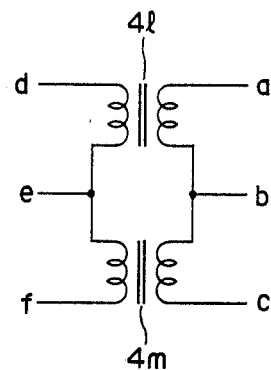
FIG. 2 is a schematic illustration showing a modification of the structure shown in FIG. 1.
Figure 3:
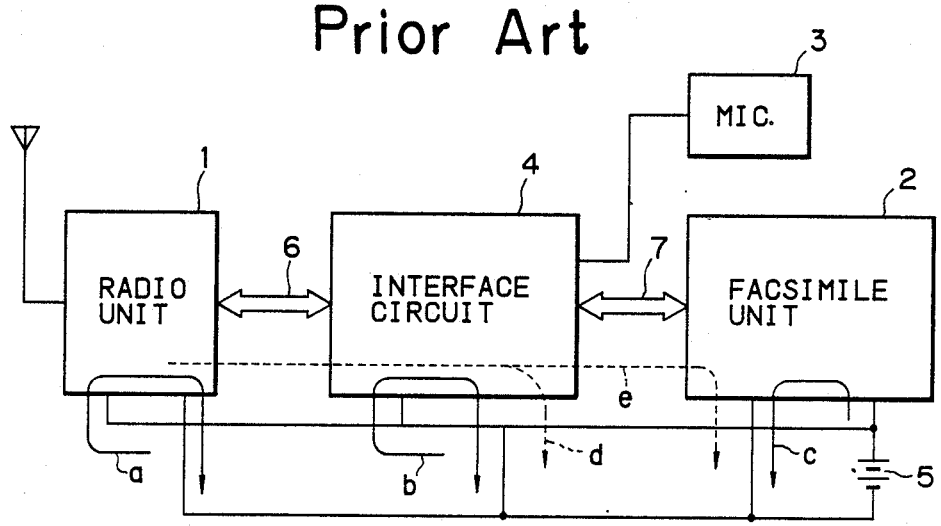
FIG. 3 is a block diagram showing a typical prior art radio communication system.

In the above-described embodiment, the hybrid transformer 4d having two windings provided with terminals a, c, d and f and center taps b and e, is used for transmission and reception. This structure contributes to make the entire structure compact in size. However, a pair of ordinary transformers 4l and 4m connected as shown in FIG. 2 may be used, which function in the same manner as the hybrid transformer 4d. In the above-described embodiment, a power supply voltage is supplied to each of the units from the same battery 5. However, batteries may be provided separately for each of the units, if desired, in which case the noise immunity characteristic is further improved. Moreover, in the above-described embodiment, an electromagnetic relay for supplying a mode select signal from one unit to another is used. However, any other relay circuit using a semiconductor element, such as a photocoupler may be used. It should further be noted that any other type of a data communication apparatus, such as a personal computer may be used, in place of the facsimile unit 2.

Figure 4:
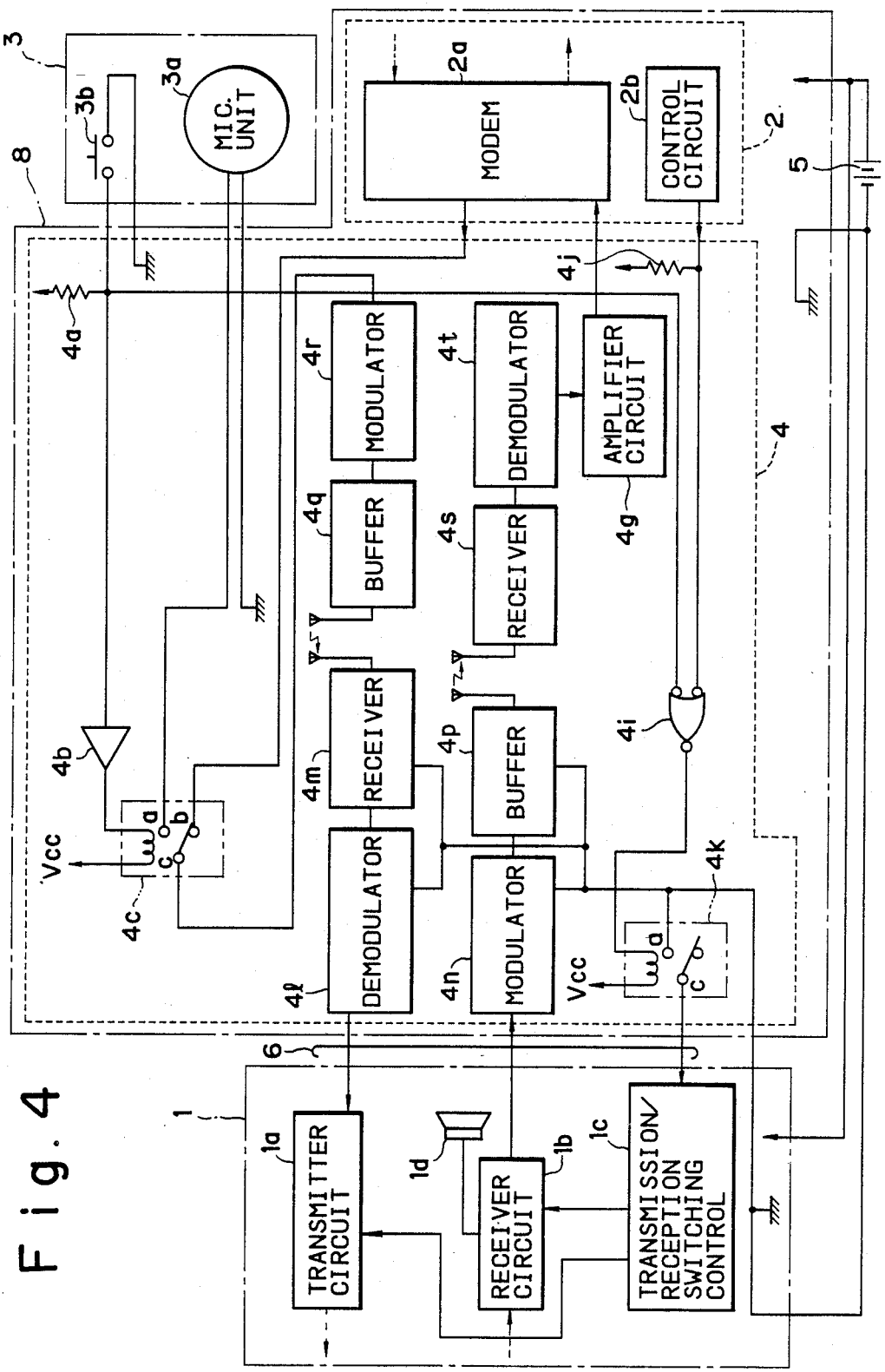
FIG. 4 is a schematic illustration showing the overall structure of a radio communication system constructed in accordance with another embodiment of the present invention.

In the above-described embodiment, a transformer has bee used as a means for decoupling the d.c. components of a signal to be handled. However, any other type of d.c. decoupling means may also be used such as photocouplers, a combination of A/D and D/A converters or radio link units. FIG. 4 shows a radio communication system constructed in accordance with another embodiment of the present invention using radio link units as a d.c. decoupling means. As shown, the system of FIG. 4 is structurally similar in many respects to the system of FIG. 1 and thus like numerals indicate like elements. However, the system of FIG. 4 includes a pair of radio link units in place of the hybrid transformer 4d. That is, the system of FIG. 4 includes a first radio link unit comprised of a demodulator 4l, a receiver 4m, a buffer 4q and a modulator 4r and a second radio link unit comprised of a modulator 4n, buffer 4p, a receiver 4s and a demodulator 4t. And, all of the demodulator 4l, receiver 4m, modulator 4n and buffer 4p are connected to the contact a of the relay 4k. In the system of FIG. 4, since signals are transmitted in the form of radio waves between the receiver 4m (or 4s) and the buffer 4q (or 4p), no d.c. components are transmitted and thus the wire transmission scheme shown in FIG. 4 functions substantially in the same manner as the system of FIG. 1.

While the above provides a full and complete disclosure of the preferred embodiments of the present invention, various modifications, alternate constructions and equivalents may be employed without departing from the true spirit and scope of the invention. For example, the present invention may also be applied to an automobile telephone unit. Therefore, the above description and illustration should not be construed as limiting the scope of the invention, which is defined by the appended claims.

What is claimed is:

1. A radio communication system comprising:
    a radio unit including a transmitter circuit, a receiver circuit and selecting means for selecting either one of said transmitter and receiver circuits for operation;
    a microphone unit;
    a data communication unit; and
    an interface circuit including a d.c. decoupling means having a first side operatively coupled to said transmitter and receiver circuits and a second side which is d.c. decoupled from said first side to prevent the passing of noise, a first switching means selectively connecting said second side to one of said microphone unit and said data communication unit, and a second switching means for selectively switching between a transmission mode and a reception mode and thus supplying a mode select signal to said selecting means.

2. The system of claim 1, wherein said d.c. decoupling means includes at least one transformer.

3. The system of claim 1, wherein said selecting means is operatively coupled to said second switching means, said selecting means selecting either said transmitter circuit or said receiver circuit in accordance with said mode select signal.

4. The system of claim 3, wherein said microphone unit includes a manually operable switch which controls said second switch to select one of the transmission and reception modes by its on/off condition.

5. The system of claim 4, wherein each of said first and second switching means includes a relay.

6. The system of claim 1, wherein said data communication unit is a facsimile unit.

* * * * *